Oct. 25, 1955

C. ROBSON 2,721,536

DOUBLE UNIT PULSATOR AND RELEASER COMBINATION FOR MILKING MACHINES

Filed March 25, 1954

INVENTOR
Charlton Robson

BY Young, Emery + Thompson
ATTORNEYS

Oct. 25, 1955  C. ROBSON  2,721,536
DOUBLE UNIT PULSATOR AND RELEASER
COMBINATION FOR MILKING MACHINES
Filed March 25, 1954  2 Sheets-Sheet 2
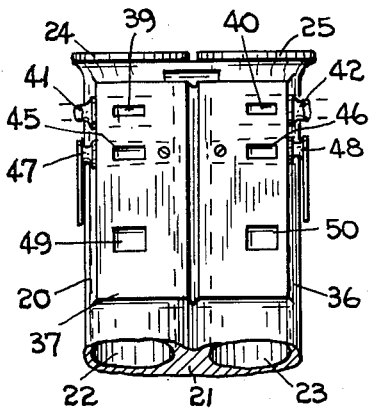
Fig.6
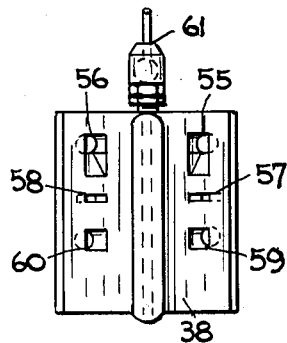
Fig.7
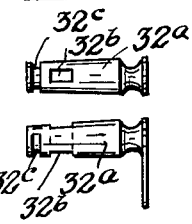
Fig.13
Fig.14
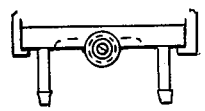
Fig.8
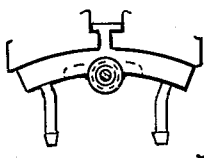
Fig.9
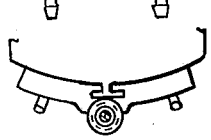
Fig.10
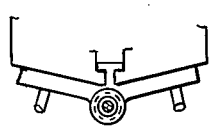
Fig.11
Fig.12
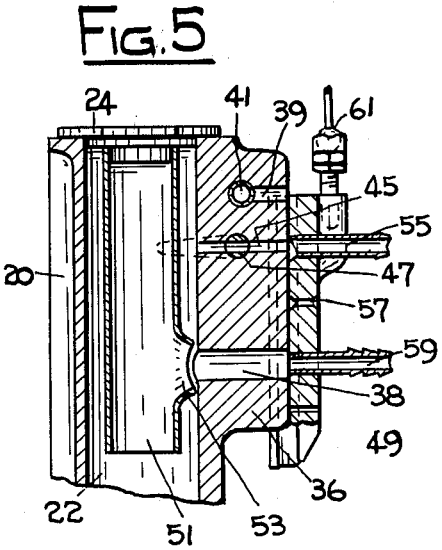
Fig.5
INVENTOR
Charlton Robson
BY Young, Emery & Thompson
ATTORNEYS

United States Patent Office 2,721,536
Patented Oct. 25, 1955

2,721,536

DOUBLE UNIT PULSATOR AND RELEASER COMBINATION FOR MILKING MACHINES

Charlton Robson, Whangarei, New Zealand

Application March 25, 1954, Serial No. 418,612

2 Claims. (Cl. 119—14.06)

This invention relates to a new or improved construction of double unit pulsator and releaser combination for milking machines.

The features of construction of this combination provide for it being mounted upon a board or other fixture at a low level between two side by side bails and for cows in the respective bails being connected thereto per the usual pulsating and milking claw and teat cup connections to effect the pulsations and milking operations of the said teat cups and to cause the milk to be drawn into the respective receiving chambers of the unit and delivered therefrom, either to an overhead milk main or to a bucket in the bail, as may be desired. Each member of the unit is capable of independent control in respect of the carrying on of the milking operations and the delivery of the milk, but both are controlled in their operations by the same mechanism.

In describing the invention reference will hereinafter be made to the accompanying drawing, in which:

Figure 5 is a partial cross sectional side view showing the port connections of one chamber with those of the slide valve;

Figure 6 is a partial front view of the double releaser with its vertical valve face and ports for each releaser chamber;

Figure 7 is an inner face view of the slide valve with its set of ports at each side of its center line;

Figures 8 to 12 are diagrammatic plans to indicate various shapes the valve face and the valve may take, and Figures 13 and 14 are two enlarged details of a valve plug later described.

Figure 1:
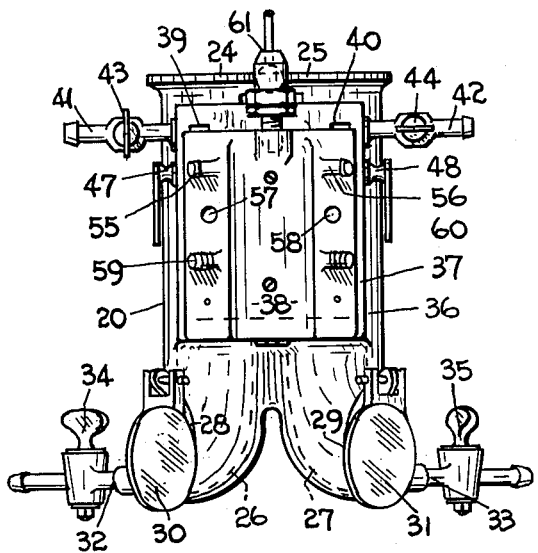
Figure 1 is a front view of the combination.
Figure 2:
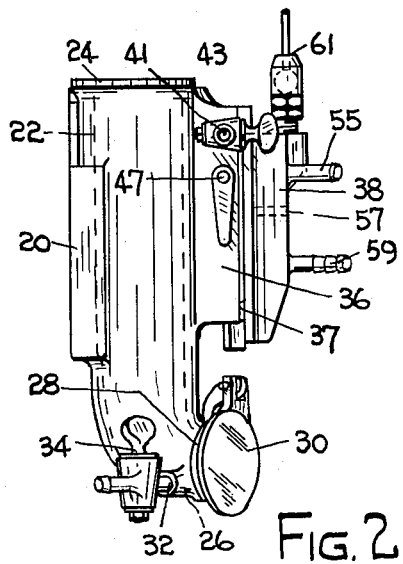
Figure 2 is a side view.

The combination of a double unit pulsator and releaser comprises a vessel 20 divided by a central wall 21 extending in the length of the vessel into two vertically disposed releaser chambers 22, 23, having open upper ends. Covers 24, 25, are provided to fit over the said upper ends of the chambers and make airtight seals. The bottom ends of the chambers 22, 23, merge into delivery chutes 26, 27, providing flat vertical valve seats 28, 29 at their lower ends, and clacks or releaser valves 30, 31, of the usual visual inspection type are hinged upon the respective seats 28, 29, to provide for free release of milk from the chambers 22, 23, into buckets or the like below them. The delivery chutes 26, 27, also have branches 32, 33, leading therefrom at their lower ends and control valves 34, 35, are included in these branches which are adapted to be connected to down dropper tubes (not shown) of a milking draw-off main so that, if desired, the chambers 22, 23, may be connected with this main, providing for the milk being drawn into such main and to a master collecting vessel instead of discharging into individual buckets.

Figure 3:
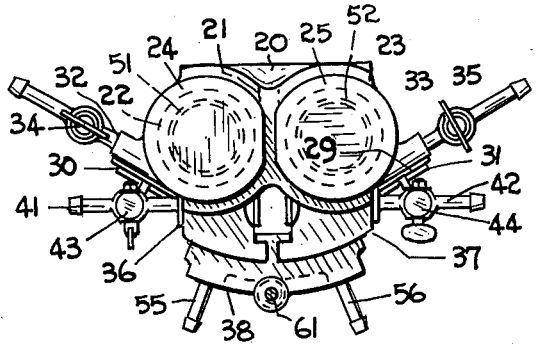
Figure 3 is a plan thereof.
Figure 4:
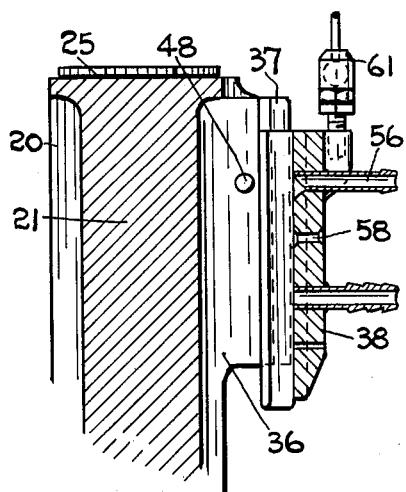
Figure 4 is a partial side view in cross section to show the slide valve in sliding engagement with a double releaser valve face.

A vertical section 36 on the outer surface of the vessel 20 is formed with a valve face 37 thereon, which is positioned to equally overlap each of the said chambers 22, 23. This valve face 37 is preferably shaped convex in its width with a central guide slot therein, as shown in Figures 3 and 6 of the drawing, to allow a one-piece dual slide valve 38 shaped concave on its under face to coincide with the convex face of 37 and with a central longitudinal guide portion in the form of a T-shaped section, as shown in drawing Figures 3 and 7, fitting into the slot in the valve face, the valve 38 being slidably mounted to move reciprocally on the valve face 37 in a hermetic sealing engagement therewith. The valve face with its guide and a slide valve with its cooperating guide portion may each be differently shaped and mounted as shown by any one of Figures 8 to 12 of the drawing so that, while the valve may slide longitudinally on the face, it cannot move sideways thereon.

The parts of the valve face 37 overlapping the chambers 22, 23, are formed with upper ports 39, 40, from which pipe lines 41, 42, controlled by valves 43, 44, provide air/vacuum pulsation connections for leads to teat cups (not shown) usually through a claw (also not shown). Below the upper ports 39 40, the valve face 37 has larger and middle ports 45, 46, formed in its overlapping parts to normally provide connections to the chambers 22, 23, through control valves 47, 48, fitted in the sides of the vertical section 36, by which alternate air and vacuum conditions may be transmitted to the chambers. One of the valves is typically shown in Figures 13 and 14 of the drawing. Also in the overlapping parts of the valve face, below the middle ports 45, 46, there are formed large and lower ports 49, 50, which afford milk-flow connection to the chambers 22, 23 from leads from the teat cups.

In the chambers 22, 23, baffle cylinders 51, 52, are attached to the underside of the covers 24, 25, providing the airtight seals for the chambers as previously mentioned. The cylinders 51, 52, have branches 53, 54, open to the milk-flow ports 49, 50, and an annular space is left between the cylinders and the surrounding wall of the chambers.

To provide for the connections referred to above, the slide valve 38 has two sets of openings consisting of upper branch openings 55, 56, adapted to be connected to a source of vacuum, i. e. the vacuum main of the milking machine installation, middle openings 57, 58, for admitting atmosphere, and lower branch openings 59, 60, adapted to be connected to the leads to the milk members of the teat cup claws (not shown). The ports 39—40, 45—46 and 49—50 in the valve face and the openings consisting of the branch openings 55—56, the direct openings 57—58 and the branch openings 59—60 in the slide valve 38 are so positioned in vertical alignment and spaced apart that, in a reciprocal movement of the slide valve, an operation shortly to be described takes place. The upper end of the slide valve 38 is connected by a ball-jointed rod 61 to an eccentric drive (not shown) for effecting such reciprocal movements.

In the operation of the unit, when the slide valve 38 is raised to its top or upward position the upper and vacuum supplying openings 55, 56, thereof are temporarily connected with the upper and pulsator ports 39, 40, of the valve face 37, the middle and atmosphere openings 57, 58, connect with the middle and atmosphere ports 45, 46, of the valve face to admit air to the chambers 22, 23 (when their control valves 43, 44 are open) and the milk branch openings 59, 60, are closed by solid parts of the valve face 37. When moved to the lowered position of the slide valve 38 the said pulsator ports 39, 40, of the valve face are uncovered and opened to atmosphere, the said vacuum openings 55, 56, of the slide valve 38 connect with the said ports 45, 46, of the valve face, the middle and air openings 57, 58, of the slide valve are closed off by solid parts of the valve face and the lower and milk branch openings 59, 60, of the slide valve connect with the lower and milk entry ports 49, 50, of the valve face to connect the milk leads from the teat cups with the chambers 22, 23.

Vacuum and atmospheric conditions in the lines from the connections 41, 42, thus take place alternately to cause the desired pulsations of the teat cup inflations. Alternate connections with air and vacuum are made with the middle air ports 45, 46, of the valve face 37, the former connections being only when the said control valves 43, 44, in the air lines 41, 42, are open. The connections of the lower milk branch openings 59, 60, of the slide valve are alternately cut off and opened to the chambers 22, 23. This provides that, with the said air control valves 47, 48 open and the control valves 34, 35 closed, the members of the unit will effect the vacuum connections to exhaust the chambers 22, 23 as the slide valve 38 moves down and then cause a break in such connections, and at the bottom of the slide movement will open the chambers 22, 23 to the milk branch openings 59, 60, so that milk will be drawn into them. Then, as the next upward travel of the slide valve 38 takes place and the milk openings 59, 60, with the chambers 22, 23, are cut off and the air entry ports opened, this will cause the milk in the chambers to be discharged from the bottom of the delivery chutes 26, 27, of the chambers 22, 23, through their clack valves 30, 31, into an open bucket (not shown), as is general when the releaser is caused to discharge into an individual bucket.

When it is desired to convert the unit to one where the milk from each releaser is not dropped therefrom into an individual bucket, as previously described, but is drawn into a common high or low line milk- draw-off main and along it into a common collecting receiver which may receive milk from many other bails, then valves 47, 48, are closed, and this seals off the chambers 22, 23, from the alternating entry of air and then vacuum conditions through the ports 45, 46. The valves 34 and 35 are then opened, and thus the chambers 22 and 23 are subjected to the influence of a continuous vacuum from the main milk line, which holds the clack valves 30, 31, closed. As the slide valve 38 reciprocates, the periodic registration of the ports 49, 50, with the milk openings 59, 60, periodically allows the milk to be drawn away from the teat cups into the chambers 22, 23, and out through the branches 32, 33, through the connecting down dropper tubes to the milk main.

Thus, in either manner of discharge, the periodic breaks in the vacuum actions to draw away the milk from the cow's teats are effected in correspondence with the alternate vacuum to air pulsations applied to the inflations of the teat cups, in a manner well known in the art.

The valves 43, 44, controlling the lines 41, 42, also serve for the purpose of cutting off the vacuum from behind the teat cup inflations when flushing the chambers 22, 23 with hot cleaning water.

The employment of the baffle cylinders 51, 52, in the chambers 22, 23, not only close off same to atmosphere, but also stops vapour mist rising into the air or vacuum lines in bail releasing.

There has thus been described a single unit which will serve by its operation to milk two cows in adjacent bails and deliver their milk into two separate releasers from which they may be separately released into individual buckets so that one cow's milk may be kept separate from the other's or, alternatively, while delivered into separate receivers in the unit, the milk may be drawn off into a common milk line and be mixed with the milk drawn off from cows in other bails.

For the sake of clarity the specification has described both releasers operating simultaneously in the same way, i. e. release to an individual bucket or to a common main, but it is manifest that, by adjusting the valves, one releaser may discharge into a bucket while the other discharges to a milk main.

Having now described my invention, what I claim is:
1. A double unit pulsator and releaser comprising a vessel divided into two separate vertically disposed chambers having open upper ends, airtight covers for said upper ends, a delivery chute opening from the bottom of each chamber, a control valve and delivery line connected to each chute and adapted to be connected to a milk main, a vertical valve face on an outer surface of the unit, said valve face equally overlapping each of said chambers, whereby said valve face is divided into two similar parts, each part having an upper port, a line connected to said port and adapted to be connected to the pulsation's sides of teat cups, each part also having a middle port with a control valve therein opening into its respective chamber, each part also having a lower port opening into its respective chamber, a one-piece dual slide valve associated with said valve face, said slide valve having two sets of three openings therein, each set comprising an upper, a middle and a lower opening, said upper opening being adapted to be connected to a source of continuous vacuum, said middle opening being open to atmosphere and said lower opening being adapted to be connected to the milk discharge compartment of teat cups, said slide valve having a first position in which its upper and middle openings are opposite the upper and middle ports of the valve face and the lower openings are not opposite, said slide valve having a second position in which its upper and lower openings are opposite the middle and lower ports of the valve face, the upper ports of the valve face being open to atmosphere and the middle opening of the slide valve facing a wall part of the valve face, said valve face and slide valve being in hermetic cooperation, and a single rod connected to said dual slide valve to reciprocate it in a vertical plane between said first and second positions.

2. A double unit pulsator and releaser comprising a vessel divided into two separate vertically disposed chambers having open upper ends, airtight covers for said upper ends, a delivery chute opening from the bottom of each chamber, a releaser valve hinged upon the chute opening to provide for free release of milk from each chamber, a vertical valve face on an outer surface of the unit, said valve face equally overlapping each of said chambers, whereby said valve face is divided into two similar parts, each part having an upper port, a line connected to said port and adapted to be connected to the pulsation's sides of teat cups, each part also having a middle port with a control valve therein opening into its respective chamber, each part also having a lower port opening into a cylinder in its respective chamber, each of said cylinders leaving an annular space between it and the surrounding chamber and being open at the bottom and closed at the top by said cover, a one-piece dual slide valve associated with said valve face, said slide valve having two sets of three openings therein, each set comprising an upper, a middle and a lower opening, said upper opening being adapted to be connected to a source of continuous vacuum, said middle opening being open to atmosphere, and said lower opening being adapted to be connected to the milk discharge compartment of teat cups, said slide valve having a first position in which its upper and middle openings are opposite the upper and middle ports of the valve face and the lower openings are not opposite, said slide valve having a second position in which its upper and lower openings are opposite the middle and lower ports of the valve face, the upper ports of the valve face being open to atmosphere, and the middle opening of the slide valve facing a wall part of the valve face, said valve face and slide valve being in hermetic cooperation, and a single rod connected to said dual slide valve to reciprocate it in a vertical plane between said first and second positions.

References Cited in the file of this patent
UNITED STATES PATENTS
1,952,544    Gordon _____ Mar. 27, 1934
FOREIGN PATENTS
509,152    Great Britain _____ July 11, 1939